United States Patent [19]

Brown, Jr.

[11] Patent Number: 4,964,058

[45] Date of Patent: Oct. 16, 1990

[54] POWER MANAGEMENT AND AUTOMATION SYSTEM

[75] Inventor: Robert J. Brown, Jr., Boca Raton, Fla.

[73] Assignee: Square D Company, Palatine, Ill.

[21] Appl. No.: 257,076

[22] Filed: Oct. 13, 1988

[51] Int. Cl.⁵ .............................................. G06F 15/20
[52] U.S. Cl. .................................... 364/492; 364/481;
364/483; 364/900; 364/923.1; 364/923.2;
340/825.07
[58] Field of Search ............... 364/481, 483, 492, 143,
364/145, 900 MS File, 200 MS File;
340/825.07

[56] References Cited

U.S. PATENT DOCUMENTS

| | | | |
|---|---|---|---|
| 4,167,786 | 9/1979 | Miller et al. | 364/900 |
| 4,402,059 | 8/1983 | Kennon et al. | 364/900 |
| 4,418,333 | 11/1983 | Schwarzbach | 364/146 |
| 4,489,385 | 12/1984 | Miller et al. | 364/900 |
| 4,771,185 | 9/1988 | Feron et al. | 364/492 |

Primary Examiner—Parshotam S. Lall
Assistant Examiner—Ellis B. Ramirez
Attorney, Agent, or Firm—Larry I. Golden; Jose W. Jimenez

[57] ABSTRACT

An automation and energy management system includes an automation panel box which may be positioned adjacent to a circuit breaker panel box. The automation panel box includes one or more circuit breaker control modules, one or more device control modules and a power module for providing power to the control modules. The circuit breaker control module provides signals to operate motorized circuit breakers, so as to turn on or off the power to a device being managed and the device control module provides signals to control individual appliances. Each of the two control modules is capable of controlling up to eight different circuit breakers or eight different individual devices and each includes a manual override button for each breaker or device controlled, which override button can be manually pressed by a person desiring to override the automation and energy management control. In addition, each of the modules includes status terminals for receiving status signals from the devices being controlled to indicate whether control is to occur or to be overridden. A facility computer generally communicates with the modules over a bus and issues commands to cause certain automatic functions or energy management to occur. The signals on the status lines can override the facility computer signals and the actuation of one of the reset buttons can override either the status signals or the facility controller.

21 Claims, 3 Drawing Sheets

POWER MANAGEMENT AND AUTOMATION SYSTEM

This invention relates to a power management and automation system, and more particularly, to such a system for managing the power consumption of selective appliances and controlling the operation of such appliances in a single facility, such as the home.

Energy management and home automation has been known for many years. However, practical systems at reasonable cost, permitting effective energy usage control and functionally controlling the operation of various home appliances, still have not been developed. To the extent that such energy control and automation systems have been developed, the homeowner becomes a slave to the automatic system, rather than the automatic system being an aide to the homeowner. For example, systems exist to automatically turn on the lights at a certain time and turn them off at a second certain time. However, in some situations, the homeowner may desire that the lights be off when the computer has been set to keep them on. In such a situation, the homeowner must reprogram the computer, rather than merely turn the lights off by simply flipping a switch.

Examples of typical prior art automation and energy management systems are shown in U.S. Pat. No. 4,740,882 in the name of Miller, U.S. Pat. No. 4,695,880 in the name of Johnson et al, U.S. Pat. No. 4,684,920 in the name of Reiter, U.S. Pat. No. 4,642,473 in the name of Bryant, U.S. Pat. No. 4,611,295 in the name of Fowler, U.S. Pat. No. 4,540,984 in the name of Waldman, U.S. Pat. No. 4,497,031 in the name of Froehling et al, U.S. Pat. No. 4,471,232 in the name of Peddie et al, U.S. Pat. No. 4,454,509 in the name of Burnnagel et al, U.S. Pat. No. 4,418,333 in the name of Schwarzbach et al, U.S. Pat. No. 4,389,577 in the name of Anderson et al, U.S. Pat. No. 4,354,120 in the name of Schonnack, U.S. Pat. No. 4,345,162 in the name of Hammer, U.S. Pat. No. 4,319,319 in the name of Wygant, U.S. Pat. No. 4,264,960 in the name of Gurr, U.S. Pat. No. 4,244,022 in the name of Kendall, U.S. Pat. No. 4,223,379 in the name of Simcoe, U.S. Pat. No. 4,217,646 in the name of Caltagirone et al, U.S. Pat. No. 4,213,182 in the name of Eichelberger et al, U.S. Pat. No. 4,022,555 in the name of Smith, U.S. Pat. No. 3,906,242 in the name of Stevenson and U.S. Pat. No. 3,790,815 in the name of Karklys. Other energy managements systems are described in PCT Patent Application Number PCT/US 87/02365, entitled "Energy Management System" in the name of Brown III et al and PCT Patent Application Number PCT/US 87/02366, entitled "Responder For Energy Management System" in the name of Brown, Jr. et al, and French Patent No. 2,495,396 in the name of Pillebout.

It is also well known that each electrical power circuit in a building, such as a home, factory or the like, are protected by a fuse device, such as a circuit breaker, against power surges and overloads. Many appliances to be monitored, such as pumps and major appliances are included as the only power consuming appliance in the circuit, that is, the circuit breaker is designed to protect only that appliance. Other types of appliances, such as lights, small kitchen appliances and the like, may be grouped together in a single power circuit and share a common circuit breaker.

Where circuit breakers are used to protect the power circuit, the circuit breakers may include a small electric motor, which responds to appropriate electric control signals for automatically tripping, setting or resetting the circuit breaker from a remote location. One significant difference between those appliances included with their own circuit breaker and those appliances which must share a circuit breaker is that normally those appliances having their own circuit breaker are almost universally subject to automation and energy management, whereas only certain of the appliances plugged in to a multi appliance circuit will be energy managed and subject to automation. The motorized circuit breaker has been used in the past as a convenient element to manage the application of power to those single appliance circuits. Such motorized circuit breakers can be turned off at those desired times when it is desired that they not operate, such as the middle of the night for water heaters.

In order to have a fully automated facility, many times it is desirable for external signals, indicating a certain status, to be provided to the automation equipment in order to determine whether an appliance or device should be turned on or off. For example, if an automatic sprinkler system pump is being controlled by the automation system, it is desirable that the system know whether the grass needs to be watered. Moisture sensing transducers or rain gauge transducers are well known and can provide such a signal indicating whether the ground is already moist or whether an adequate amount of rain has fallen. If such signals are provided, the automation system should respond thereto by not turning on the sprinkler system. Another example is an automatic light control system which may automatically turn on the lights at a certain time, such as dusk, and turn off the lights at a certain other time, such as dawn. Optical sensors are well known devices to control such outdoor lights. In some circumstances, the homeowner desires to be able to override the sensor of the automation system. Many prior art devices would require the homeowner to reprogram a computer system, rather than simply operate a switch to reverse the automation systems sensor commands.

The automation system may additionally include items which are not typically subject to energy management such as being turned on and off. For example, the automation system may include a security system which responds upon sensing the opening or closing of windows or doors or the detection of a person by motion or heat sensing equipment. Upon detecting a breach of security, the automation system should automatically call for assistance or sound an alarm. Such a system can be incorporated into an overall automation system to automatically be turned on during certain hours, such as the middle of the night or the normal daylight hours when all family members are working or in school. However such security systems must be easily reset whenever a family schedule change occurs, such as a person arriving home late in the evening or staying home from work due to illness, vacation, holidays and the like. Such resetting must be as simple as existing free standing systems by operating an encoded switch or the like, and not by reprogramming a computer.

In many energy management and home automation systems, it is not practical in every instance to send the status signals determining whether automation should occur or the homeowner override signals back to the central automation computer. For one thing, a computer would become overburdened in monitoring so many signals and this would result in delays between the sending of a signal and the servicing of a signal. For example, when the computer polling or being interrupted by a plurality of a status or override signals becomes backlogged by servicing too many requests, a person could walk into a room and find the lights would not go on for several seconds after the switch was turned, the police would be called before the security system override code was recognized and acted upon by the computer. To solve this problem, some mechanism, which is independent of the automation computer must be developed to override the computer's commands. In addition, it is further necessary that the homeowner have the final determination of whether the status signals are to be followed. For example, despite the fact a status signal indicates that sufficient rain has fallen so as to prevent the turning on of the automatic sprinkler system, the homeowner may desire the system be turned on for other reasons, such as newly planted grass. Hence, overall override means must be provided under the control of the homeowner to override either the automation system, as determined first by the computer system or, second, as determined by the response to the status signals.

In accordance with one aspect of this invention, there is provided a power management and automation system for controlling the operation of a plurality of appliances in a facility. A first type of the controlled appliances are the sole appliances in a first power circuit and a second type of the controlled appliances are included with a plurality of appliances grouped together in a second power circuit. Each power circuit further includes a circuit breaker for controlling the application of power to that power circuit. The system comprises a programmable controller for providing a series of signals manifesting when operational control of selected ones of either type of appliance is to occur. Further the system includes a circuit breaker control module for providing an output signal to control a switchable circuit breaker between the on and off states so as to control the application of power to a selected first type of appliance in the power circuit with which that switchable circuit breaker is included and a point of use control module for providing an output signal to a controllable switch means to control the application of power to a selected one of the second type of appliances. Each of the circuit breaker control modules and the point of use control modules include manually operable switchable means associated therewith and an input terminal to which is applied an externally provided control signal from means associated with the appliance being operationally controlled and processor means responsive to the programmable controller signals to the operation of the manual operable switchable means and to the externally provided signal for providing the output signal.

One preferred embodiment of the subject invention is hereafter described, with specific reference being made to the following Figures, in which.

Figure 1:
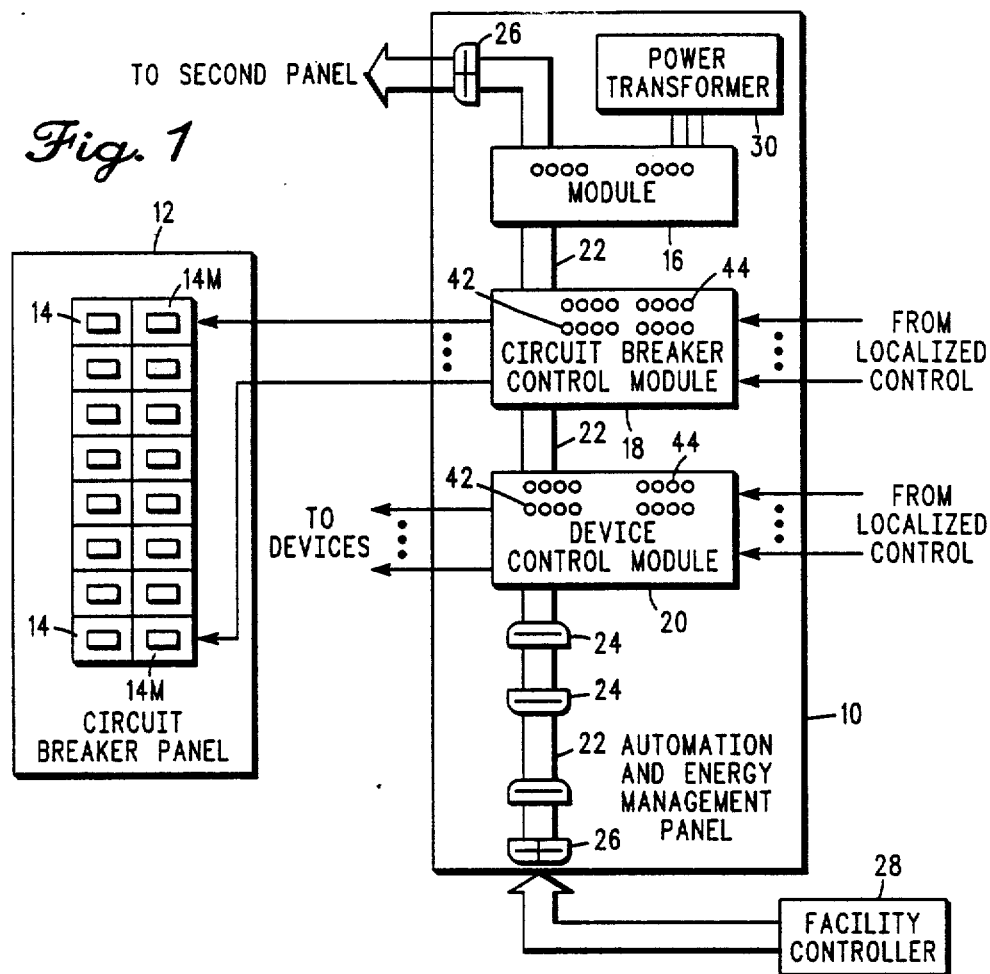
FIG. 1 shows the arrangement of a circuit breaker panel and the computer automation and energy managing panel of the subject invention.

Referring now to FIG. 1, automation and energy management panel 10 is shown and may be positioned adjacent to a conventional circuit breaker panel 12. Both of panels 10 and 12 may include an encloser, such as model number Q 040-M200 Manufactured by the Square D Company of Palatine, Illinois. Each panel further would include a backplane (not shown) to which a module, such as circuit breakers 14 or module 16, are snap locked for being held in the panel boxes 10 or 12. The circuit breakers 14 may include manual circuit breakers 14 and motorized circuit breakers 14M. Motorized circuit breakers 14M may be controlled by signals applied to a small electric actuated motor included therein to automatically be switchable between the on and the off states. Both circuit breakers 14 and motorized circuit breakers 14M are commonly available for various amperage ratings in the marketplace, such as from the Square D Company.

It is well known that a circuit breaker, such as circuit breakers 14 or 14M, protect a single electric wiring circuit in a facility, such as the home from overloads and power surges. The protected circuit may have a single appliance or device associated therewith, such as a motor, water heater or the like, or may have a plurality of different appliances, such as lights and various small appliances connected through receptacles to the circuit. Whenever a circuit breaker 14 or 14M is in the on position, power may be applied to any or all of the appliances in that particular power circuit and when the circuit breaker 14 or 14M is moved to the off position, whether as a result of an overload or power surge, or as a result of a signal applied to a motorized circuit breaker 14M or as a result of a person manually tripping the breaker, power is disconnected from that particular power circuit.

The automation and energy management panel 10 includes three principle types of modules inserted therein. These modules are the power module 16, the circuit breaker control module 18 and the device control module 20. Each automation and energy management panel 10 will include one power module 16, which is designed to provide power to the remaining modules. Any number, within the space limitations of panel 10 of circuit breaker control modules 18 or device control modules 20, may be inserted into panel 10 depending on the number of motorized circuit breakers 14M or individual devices to be controlled. Further, and as described hereafter, each of the circuit breaker control modules 18 and device control modules 20 may be designed to control up to eight different motorized circuit breakers 14M or individual devices.

Within panel 10, a backplane (not shown) is included and each of the modules 16, 18 and 20 are snap locked to the backplane. In addition, a wiring bus 22 is provided along the backplane and includes a plurality of multi-pin connectors 24 into which each of the modules 16, 18 and 20 are connected. Each of the connectors 24 may be hard wired with a different address to permit a computerized facility controller 28, described in more detail hereafter, to communicate therewith. To avoid confusion, the power module 16 is always inserted into the top, or first, connector 24 and the control modules 18 and 20 are inserted in any order into the next successive lower connectors 24. The ends of wiring bus 22 each include a pair of connectors 26, such as conventional RJ 11 telephone jacks, which may be used to couple wiring bus 22 to a facility controller 28 or to a second panel, similar to panel 10, containing additional circuit breaker and device control modules 18 and 20.

Power module 16 receives 24 volt a.c. power from a power transformer 30, which steps down the normal line current of 120 volts a.c. or 277 volts a.c. to 24 volts a.c. The power module 16 regulated the a.c. signal provided thereto and provides a 24 volt d.c. and a pair of 5 volt d.c. signals over wiring bus 22 to the various modules 18 and 20 plugged into connectors 24 of wiring bus 22. The two 5 volt d.c. signals provided by power module 16 are applied to different ones of the circuit breaker control modules 18 and device control modules 20 in order to prevent undue loading on the 5 volt d.c. signal. The front of power module 16 includes three light emitting diodes (LEDs) which, when illuminated, indicate that the proper power is being applied from power module 16.

The circuit breaker control module 18 and device control module 20 are identical, except for the type of output signal applied therefrom. The output signal from circuit breaker control module 18 is designed to actuate the motor included in one of the motorized circuit breakers 14M contained in panel 12. Such actuation may be from the off to the on state or from the on to the off state as desired. Typically, this signal is a short pulse of, for instance, 75 milliseconds. The output signals from device control module 20 may be pulses or steady state digital signals designed to control other remote devices by, for example, permitting the application of power thereto or preventing the application of power thereto or causing a certain function to be performed. The other remote devices may have motors which can be actuated to turn a switch from one to another position, or may have relays which are maintained open or closed. Alternatively, the remote device controlled by device control module 20 may, itself, be computer controlled by its own internal computer or by facility controller 28, and would merely be looking for a change of state of the signal provided thereto from module 20 and respond thereto in an appropriate programmed manner. For example, an automatic telephone dialing system may dial an emergency number, such as 911, in response to a signal from module 20 going from a low to a high state.

Each of the modules 18 and 20 are also capable of receiving signals from external sources in addition to the signals received over bus 22 from facility controller 28. The external sources may be the device being controlled or a sensor associated with the device being controlled. For example, once an automatic telephone dialing system dialed the 911 number, it could send an acknowledgment signal back to control module 20. Alternatively, event signals could be sent to modules 18 or 20 to override preprogrammed commands from facility computer 28. For example, a lawn sprinkler motor may be preprogrammed to turn on at a certain time and the override status signal from a rain gauge may prevent such action if it detects the lawn is sufficiently wet or if it is raining.

Lastly, each of the control modules 18 and 20 include an override button 44 and status light 44 for each of the motorized circuit breakers 14M or devices being controlled. The override buttons 42 may be actuated by a person to override all other commands from facility controller 28 or from the external signals and the status lights, by being on, off or flashing, indicate the then existing status of the control function.

Figure 2:
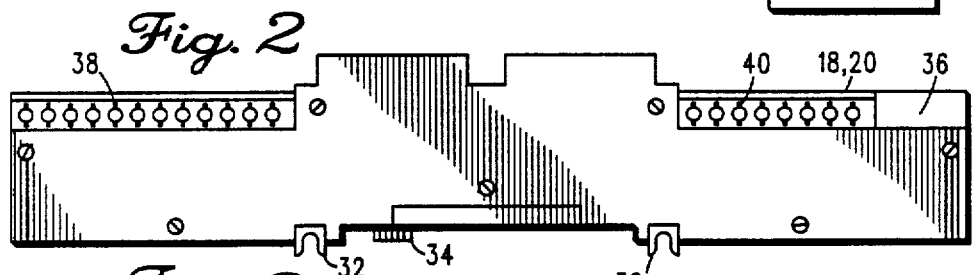
FIG. 2 is a side view of one of the control modules shown in FIG. 1.
Figure 3:
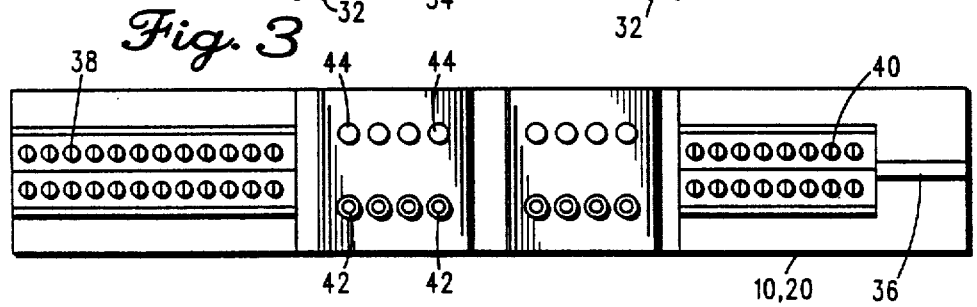
FIG. 3 is a front view of the control module shown in FIG. 2.

Referring now to FIGS. 2 and 3, the physical characteristics of control modules 18 and 20 is shown, with FIG. 2 showing a side view and FIG. 3 showing a facing or front view of one of the modules 18 or 20. Each of the modules 18 and 20 include a pair of clips 32 designed and positioned to be snap locked into a conventional backplane used with panel 10. In addition, a male connector 34 extends from the bottom of modules 18 or 20 and is adapted to be plugged into one of the module female connectors 24, shown in FIG. 1. When connector 34 is inserted into connector 24, both power from power module 16, as well as control signals from facility controller 28 may be provided to the circuit elements contained on printed circuit board 36 contained within module 18 or 20. Also connected to circuit board 36, is twenty-four output terminals 38 and sixteen input terminals 40, each of which is adapted to having a single wire secured thereto. The sixteen input terminals 40 may be grouped into eight pairs to provide a pair of wires from each external source, such as the device being controlled by one of the modules 18 or 20. Similarly, the output modules contained eight groups of three terminals, so as to permit three wires to be provided to each of the motorized circuit breaker 14M or devices being controlled. Where a motorized circuit breaker 14M is being controlled, the three wires of each group may be designated as a motor forward, a motor reverse, and a common wire. Where an individual device is being controlled, the three output terminals of each group may be designated as a normally open contact, a normally closed contact and a common wire.

Eight manual override switch buttons 42 and eight status light emitting diodes (LEDs) 44 are provided on the face of modules 18 and 20. Switches 42 may be depressed by the user, such as homeowner, of the automation and energy management system to override any command signals, such as the external signals from the devices being controlled or the command signals from facility controller 28. The LEDs 44 may be illuminated, not illuminated or flashing, possibility at several different rates, to provide various status indication of whether one of the devices being controlled is on or off, or the type of control then occurring.

The power module 16 is identical to the modules 18 and 20 shown in FIG. 2, with the exception that output terminals 38 and input terminals 40 are not present and the front panel only includes three light emitting diodes, respectively representing the two plus five volt d.c. signals and the plus 24 volt d.c. signals provided by power module 16.

Figure 4:
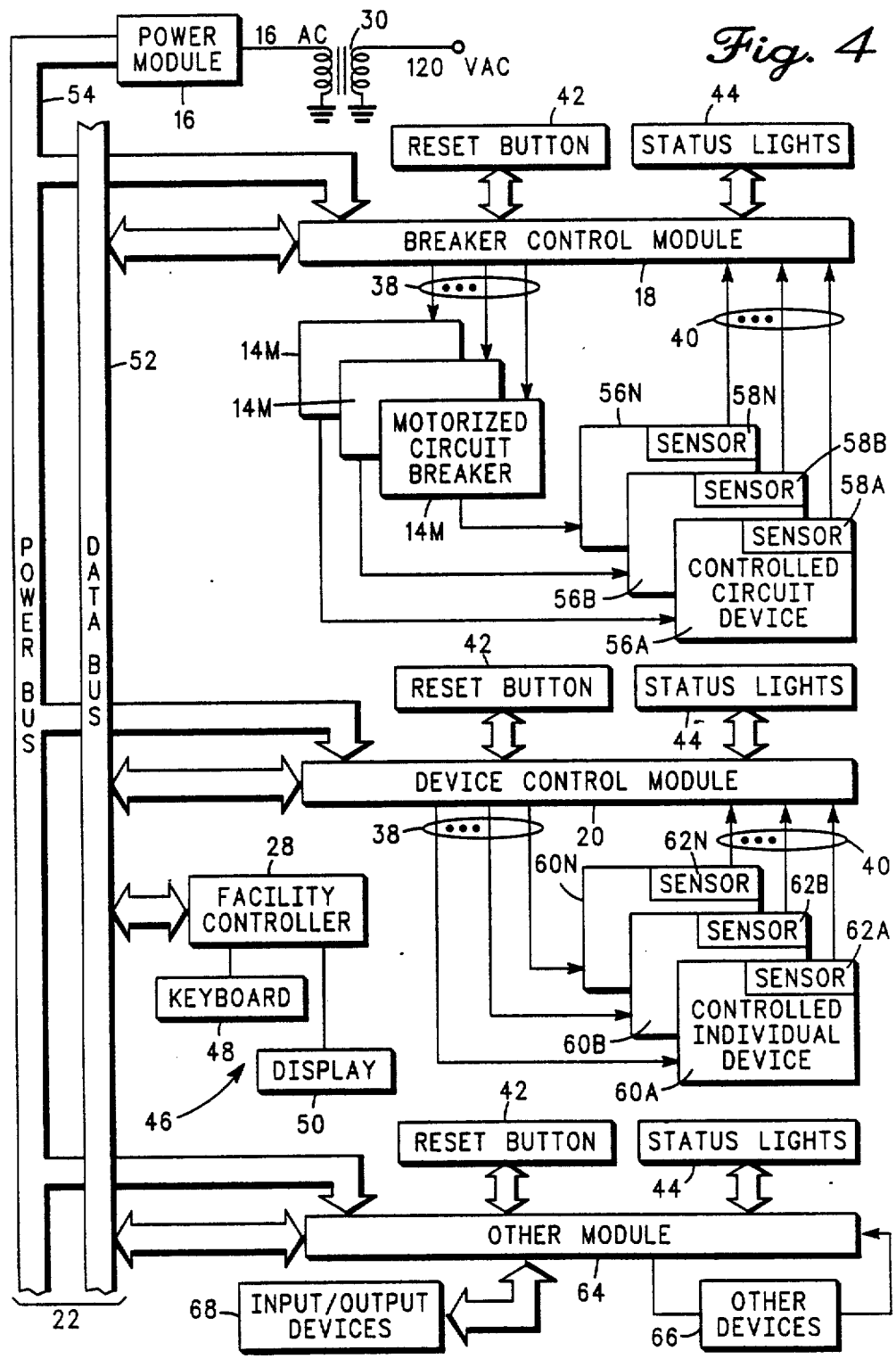
FIG. 4 is an electrical block diagram of the system of the subject invention.

Referring now to FIG. 4, an electrical block diagram illustrating an automation and energy management system 46 is shown. System 46 may, for example, be a single home in which certain devices are managed for energy usage and certain other devices are automated. In FIG. 4, elements previously described are given like numerical designations. The heart of system 46 is the facility controller 28. Facility controller 28 may be a conventional personal computer, such as an I.B.M. personal computer XT, or compatible or a specially modified computer device adapted specifically for the automation and energy management function described herein. Controller 28 will typically have a keyboard 48 and display 50 attached thereto in a conventional manner for permitting the entrance of data through the keyboard 48 or the display of messages to the user through display 50. Controller 28 may additionally have other devices attached thereto, such as memories, modems, printers and the like commonly found with personal computers, or it may have specially adapted devices attached thereto, such as security systems, video control systems, telephone systems and the like.

Facility controller 28 provides the control signals to a data bus 52, which is coupled, through connector 26 in FIG. 1, to be a part of wiring bus 22 in panel 10. The signals provided by controller 28 to data bus 52 will typically identify the address of a particular one of the modules 18 or 20 and, within that addressed module, which one of the eight circuit breakers or devices is to be controlled. The address of each module 18 or 20 is determined by the address code pre-wired in the connector 24, as previously discussed. Additionally, the facility controller 28 signal will manifest a data code, such as indicating whether a switch should be turned on or off.

As previously mentioned, power module 16 responds to a 16 volt a.c. signal provided thereto from transformer 30, which, in turn, responds to the line voltage, typically is 120 volts a.c. in a home. Power module 16 converts the a.c. signal to three d.c. signals ($+5$ volts, $+5$ volts and $+24$ volts) by using conventional voltage regulator circuit packs and these three d.c. signals are provided from power module 16 to power bus 54. In addition, power module 16 provides 8 volt a.c. and 24 volt a.c. signals, together with d.c. and a.c. ground signals to power bus 54.

As previously described, both circuit breaker control module 18 and device control module 20 have eight reset switch buttons 42 and eight status lights 44 interconnected therewith. Further, each of modules 18 and 20 provide eight sets of output signals over connectors 38 and receive eight sets of input signals through connectors 40. Specifically, with respect to circuit breaker control module 18, up to eight motorized circuit breakers 14M may be coupled to the output connectors 38 as previously described. Appropriate signals provided from module 18 can cause the motor associated with any one of the motorized circuit breakers 14M to be force to the on (closed) or off (open) condition. Module 18, thus, is typically used to control devices which are the only devices within a particular power circuit within the facility. For example, motors, water heaters, and the like normally are wired as the only energy consuming device in a power circuit, which of course, contains a circuit breaker. By making the circuit breaker of such power circuits a motorized circuit breaker 14M, the operation of such appliance itself may be easily controlled by simply controlling the motorized circuit breaker 14M. Since control panel 10 may be placed near circuit breaker panel 12, wiring is minimized between the circuit breaker control module 18 and the motorized circuit breaker 14M, as compared to providing wires to, for example, a remote relay of a remotely switch controlled lights located outside the home.

Each power circuit protected by a motorized circuit breaker 14M provides power to one of the controlled circuit device 56a through 56n. As previously mentioned, the controlled circuit devices 56a through 56n, may be hot water heaters, motors, for example used for sprinkling the lawn or filtering a swimming pool, and the like. Each of these devices 56a through 56n may have a sensor either associated therewith, such as a thermostat, in the case of the water heater, or a sensor located remote therefrom, such as the moisture sensor or rain gauge associated with a lawn sprinkling pump. Some, but not necessarily all, of the sensors 58a through 58n provide status signals to connector 40 to breaker control module 18. For example, sensor 58b may be a thermostat associated with an hot water heater device 56b which turns heating element in device 56b on and off based upon its setting relative to the temperature of the water. Depending upon the degree of automation desired, it may be unnecessary for thermostat sensor 56b to provide its signal to breaker module 18. In this case, no signals are applied to the terminal connectors of terminal 40 with respect to the second device being controlled 56b. Other sensors, such as 58n, may be located remote from the device being controlled 56n, such as a moisture sensor which is used to determine whether or not a sprinkler pump should be turned on. Other sensors, such as a photo cell associated with outside lights may be physically connected to the device under control as indicated by sensor 58a associated with device 56a and which provides a signal directly to module 18.

Device control module 20 is similar to circuit breaker control module 18, except that the signals provided through output terminals 38 are provided directly to the controlled individual devices 60a through 60n. Selected ones of the controlled unit 60a through 60n also have a sensor 62a through 62n associated therewith in the same manner as sensors 58a through 58n were associated with controlled circuit units 56a through 56n. In other words, some sensors may be totally remote, others may be physically connected with the device under control and still other units 60a through 60n under control may have no sensor. Again, signals are provided through the output terminals 38 to control the various controlled individual devices 60a through 60n, that is, to turn them on or turn them off or to cause them to perform a particular function. The sensors 62a through 62n may indicate, for example, whether the sensor is on or off or whether it should be turned on or off or may constitute an acknowledgment that the commanded function has been performed. The sensors 62a through 62n may also indicate a manual command, such as an override, by the homeowner. In other words, if one of the controlled individual units 60 is a motorized light switch for a room, the sensor 62 associated with that unit could be an indication of whether the homeowner has physically turned the switch on or off. In this case, that would override whatever the facility controller 28 instructed module 20 to do with respect to that device.

In addition to the principle circuit breaker control module 18 and device control module 20, shown in system 46, other modules 64, which may or may not include reset buttons 42 or status lights 44, may be inserted into panel 10. Such other modules may be used to control security or to control certain specialized appliances, such as video tape recorders and the like. Generally, the other modules 64 will operate on other devices 66 and receive status signals from other input 68. They may also provide signals to the other inputs/outputs devices 68 to control them, as well as receive status signals therefrom. While the other modules are shown in system 46 as receiving signals from facility controller 28, this may or may not be the case in that they may be totally independent of facility controller 28 or may be coupled thereto only to provide status information rather than to receive control.

Figure 5:
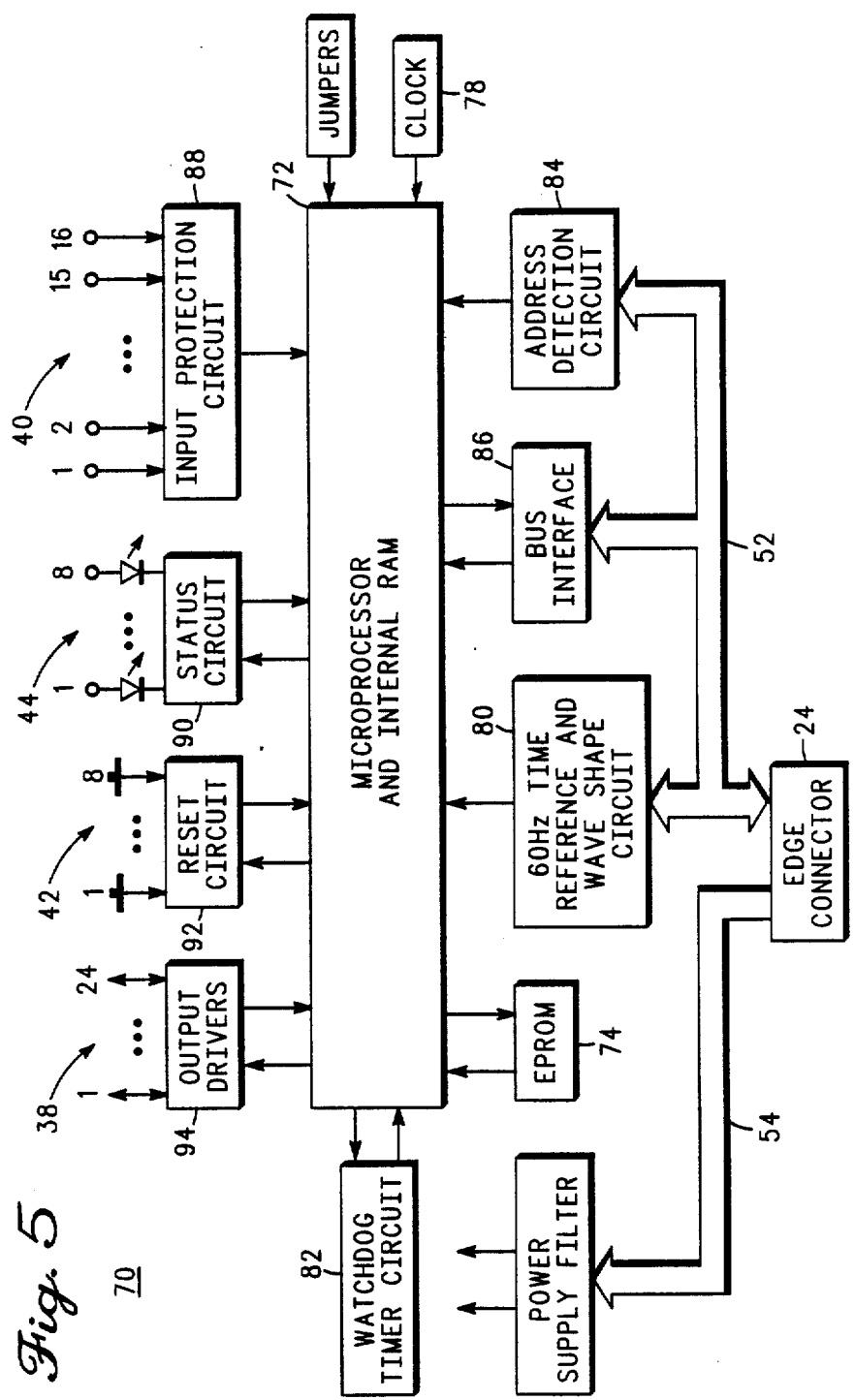
FIG. 5 is a block diagram of the internal circuitry of the breaker control module or point of use module shown, in FIGS. 2 and 3.

Referring now to FIG. 5, a block diagram of the electronic system 70 within one of the modules 18 or 20 is shown. Components previously described are given the prior identification numbers. The heart of system 70 is an eight bit microprocessor, which includes internal random access memory (RAM), such as the Motorola microprocessor number 63705. Microprocessor 72 is under the control of a program contained in the EPROM 74, that determines the functions microprocessor 72 performs. These functions may be varied depending on the setting of jumpers 76 associated with microprocessor 72.

Microprocessor 72 operates under the control of a 4.9152 MHz crystal oscillator clock 78. Synchronization is maintained by the 60 hertz timing reference and wave shaping circuit 80, which synchronizes microprocessor 72 with the other similar microprocessors within the other modules 18 or 20. Such synchronization is necessary because facility controller 28 only communicates with one module 18 or 20 at a time over bus 52. Thus, the various microprocessors similar to 72 and the other modules are merely waiting for access to bus 52 and must be synchronized based on a common stable frequency.

The watchdog timer circuit 82 is an internal supervisor and monitor for microprocessor 72. Microprocessor 72 periodically sends acknowledgment signals to watchdog timer circuit 82 to indicate that it is properly functioning without any disturbances. If these acknowledgments signals are too late or too early, watchdog circuit 82 is connected to reset processor 72 and restart it.

Communication between microprocessor 72 and facility controller 28, shown in FIG. 4, is over bus 52. This is controlled by the address detect circuit 84 and the bus interface circuit 86. As previously mentioned, the address of each module 18 or 20 is hard wired into connector 24; when an appropriate address is provided over bus 52, the address detector 84 detects that address based on the hard wired connector 24 and permits microprocessor 72 to have access to bus 52 by opening bus interface circuit 86.

Each of the input lines connected to input terminal 40 are provided through an input protection circuit 88. Microprocessor 70 continually monitors the signals provided to input protection circuit 88 and notes any change therein requiring a change in the output signals. Some status signal changes will result in immediate action by microprocessor 74 and others will be stored in the internal RAM to inhibit action in response to commands from facility controller 28. Similarly, the status lights 44 are in communication with microprocessor 70 through a status circuit 90 and the reset buttons 42 are in communication through a reset circuit 92. Microprocessor 72 is programmed to provide signals to illuminate the various status lights 44 or check whether a light is on or off through status circuit 90. Similarly, microprocessor 72 monitors communication with the reset buttons 42 through reset circuit 92 in that it can send signals to the buttons or receive signals whenever one of the buttons 42 is depressed.

The output signals provided over terminals 38 are provided through output drivers 94. Again, output drivers 94 are coupled to be in two way communication with microprocessor 72 in that microprocessor 72 can provide signals through output driver circuit 94 to any one or more of the 24 output terminals or it can read the signal on any of the output terminals. The type of driver circuits included in output driver circuit 94 will depend upon whether a motorized circuit breaker 14M or a device 60a-60n is being controlled. This circuit is the only one which will differ between the circuit breaker control module 18 and the device control module 20.

As is apparent from FIG. 5, microprocessor 72 may be controlled from three different sources. These three sources would be the facility controller 28, the status signals provided through input protection circuit 88 and the manual operation of one of the reset buttons 42. Under some circumstances, microprocessor 72 could receive conflicting information from the three different inputs thereto. Thus, an order of prioritization is required and this order has been selected to be such that the highest priority is the push buttons 42, the next highest priority is the status signals applied through the input terminals 40 and the lowest priority is the commands from the facility controller 28. The reason for this order is that the highest priority is given to the human actions of depressing reset buttons 42 and the next highest priority is given to the status signals provided to terminal 40 because these signals manifest actual events occurring. The lowest priority is then the preprogrammed assumption of future events contained in facility controller 28.

Thus, the modular configuration of system 46, described herein, permits the ability to include a variety of different types of control modules, such as the power control modules 18 and 20, as well as other types of modules, such as telephone control, entertainment control and security control and so forth, into a common energy management and automation system, all primarily contained in panel 10. This permits easier wiring to permit the desired control an automation, as well as places many of the functions normally required to accomplish many different tasks at a common location.

What is claimed is:

1. A power management and automation system for controlling power to a plurality of appliances in a facility, comprising:

a circuit breaker arrangement, responsive to a circuit breaker control signal, through which power is provided to at least a first one of the plurality of appliances;

a power switching circuit, responsive to an appliance control signal, for switching power to at least a second one of the plurality of appliances at its point of use;

a programmable controller for generating commands to indicate when power to the respective ones of the plurality of appliances should be provided;

a circuit breaker control module, responsive to the programmable controller, for generating the circuit breaker control signal; and a point of use control module including processing means, responsive to the programmable controller, for generating the appliance control signal for the power switching circuit, and manually operable switch means for providing an override power switching function which allows a user to control the power switching circuit independently of the programmable controller.

2. The invention according to claim 1, wherein the circuit breaker control module includes manually operable switch means for providing an override power switching function which allows a user to control the circuit breaker locally.

3. The invention according to claim 1 wherein each of said circuit breaker control modules and said point of use control module provide a plurality of output signals to operationally control a plurality of appliances.

4. The invention according to claim 3:
wherein each of said circuit breaker control module and said point of use control module includes:
a plurality of manually operable switchable means associated therewith,
a plurality input terminals, each responsive to an externally provided control signal from means associated with said appliance being operationally controlled, and
a plurality of output terminals; and
wherein each of said switchable means, input terminals and output terminals are in a corresponding relationship with one another.

5. The invention according to claim 4 wherein said processor means provides said output signal in a priority basis in order of highest to lowest priority of a response to said switchable means, said externally provided signals and said controller signals.

6. A module for use in an energy management system in which the operation of an appliance is managed by controlling the application of power thereto, said management being determined by a programmed controller which provides signals manifesting the programmed management of said appliance, said system including means for providing a command signal, at least one state of which manifests a command to alter the preprogrammed management of said appliance whenever a certain event has occurred, said module comprising:
a controller terminal coupled to receive said controller signals;
an input terminal coupled to receive said command signal;
means to receive data manifesting the state of a manually operable override switch;
an output terminal coupled to remove the application of power from being applied to said appliance; and
means, responsive to the state of said override switch and to signals provided to said input terminal and said controller terminal, for providing an output signal to said output terminal to manage said appliance, the state of said output signal being determined in a priority order of said override switch state, said command signal state and said controller signals manifestation.

7. The invention according to claim 5 wherein said module includes a plurality of corresponding input terminals, output terminals and means to receive override switch data for managing the application of power to a plurality of appliances, said controller providing signals to said controller terminal manifesting the programmed management of each of said plurality of appliances, and said output signal providing means for providing an output signal for each of said plurality of output terminals in priority ordered response to a corresponding override switch data, command signal, and controller signal manifestation.

8. A modular power and automation system for monitoring and controlling a plurality of different devices in a facility comprising:
a plurality of remote signal providing means, each for providing a remote signal manifesting an existing event associated with one of said devices;
controller means for providing command signals to a communications bus manifesting that control is to occur for one of said devices;
a plurality of controller modules for providing an output signal to control one of said devices, each module including user actuated reset switch means for generating a reset signal when actuated and each module being connected within a common enclosure to respond to said communication bus signals and to selected ones of said remote signals, each module further including means for prioritizing the state of said output signal in order of the ordered response to the provision of said reset signal, said remote signal and said command signals provided thereto.

9. The invention according to claim 8 wherein said common enclosure includes a power module for providing power signals to each of said control modules.

10. The invention according to claim 8 wherein one of said control modules provides said output signal to control the state of motorized circuit breaker protecting a power circuit containing a selected one of said different devices.

11. The invention according to claim 10 wherein a second one of said control modules provides said output signal to directly control a selected one of said different devices.

12. The invention according to claim 8 wherein each of said control modules are connected within said common enclosure to said communications bus through a connector defining a preset address of the control module.

13. The invention according to claim 12:
wherein said controller means provides said command signals as addressed to one of said control modules;
wherein each of said control modules includes address decoding means for responding to said command signals when addressed thereto; and
wherein each of said control modules includes synchronizing means for maintaining said module synchronized to a common standard.

14. The invention according to claim 13 wherein said common enclosure includes a power module for providing power signals to each of said control modules.

15. The invention according to claim 14 wherein said power module provides 60 Hz line signal to each of said control modules as said common standard for synchronization.

16. The invention according to claim 8:
wherein each of said modules includes a plurality of user actuated reset switch means, each providing a reset signal, and each of said modules respond to a plurality of remote signals; and
wherein each of said modules provide a plurality of output signals to control a corresponding plurality of devices in response to said plurality of reset signals and said plurality of remote signals, respectively.

17. The invention according to claim 16 wherein said common enclosure includes a power module for providing power signals to each of said control modules.

18. The invention according to claim 16 wherein one of said control modules provides said output signals to directly control selected ones of said different devices.

19. The invention according to claim 16 wherein at least one of said control modules provides said output signals to control the state of a motorized circuit breaker protecting power circuits, which contains a selected one of said different devices.

20. The invention according to claim 19 wherein a second one of said control modules provides said output signals to directly control selected ones of said different devices.

21. A power management and automation system for controlling power to a first set and a second set of appliances, comprising:
- a circuit breaker arrangement, responsive to a plurality of circuit breaker control signals, through which power is provided to the first set of appliances;
- a power switching circuit, responsive to a plurality of appliance control signals, for switching power to the second set of appliances at their point of use;
- a programmable controller for generating commands to indicate when power to the selected ones of the appliances should be provided;
- a circuit breaker control module including
  - a plurality of input terminals, each responsive to an externally provided breaker signal from means associated with said first set of appliances being operationally controlled;
  - processing means, responsive to the programmable controller and the breaker signals, for generating the circuit breaker control signals, and
  - manually operable switch means for providing an override power switching function which allows a user to control the circuit breaker arrangement independently of the commands generated by the programmable controller;
- a point of use control module including
  - a plurality of input terminals, each responsive to an externally provided point of use signal from means associated with said second set of appliances being operationally controlled;
  - processing means, responsive to the programmable controller and the point of use signal, for generating the appliance control signal for the power switching circuit, and
  - manually operable switch means for providing an override power switching function which allows a user to control the power switching circuit independently of the commands generated by the programmable controller.

* * * * *